March 2, 1965  J. SÖHLEMANN  3,171,354
SHAFT BEARINGS SEALING AND LUBRICATING DEVICE AND METHOD
Filed Feb. 6, 1963  4 Sheets-Sheet 1

Inventor:
Just Söhlemann
BY: McGlew and Toren,
Attorneys

Inventor:
Just Söhlemann

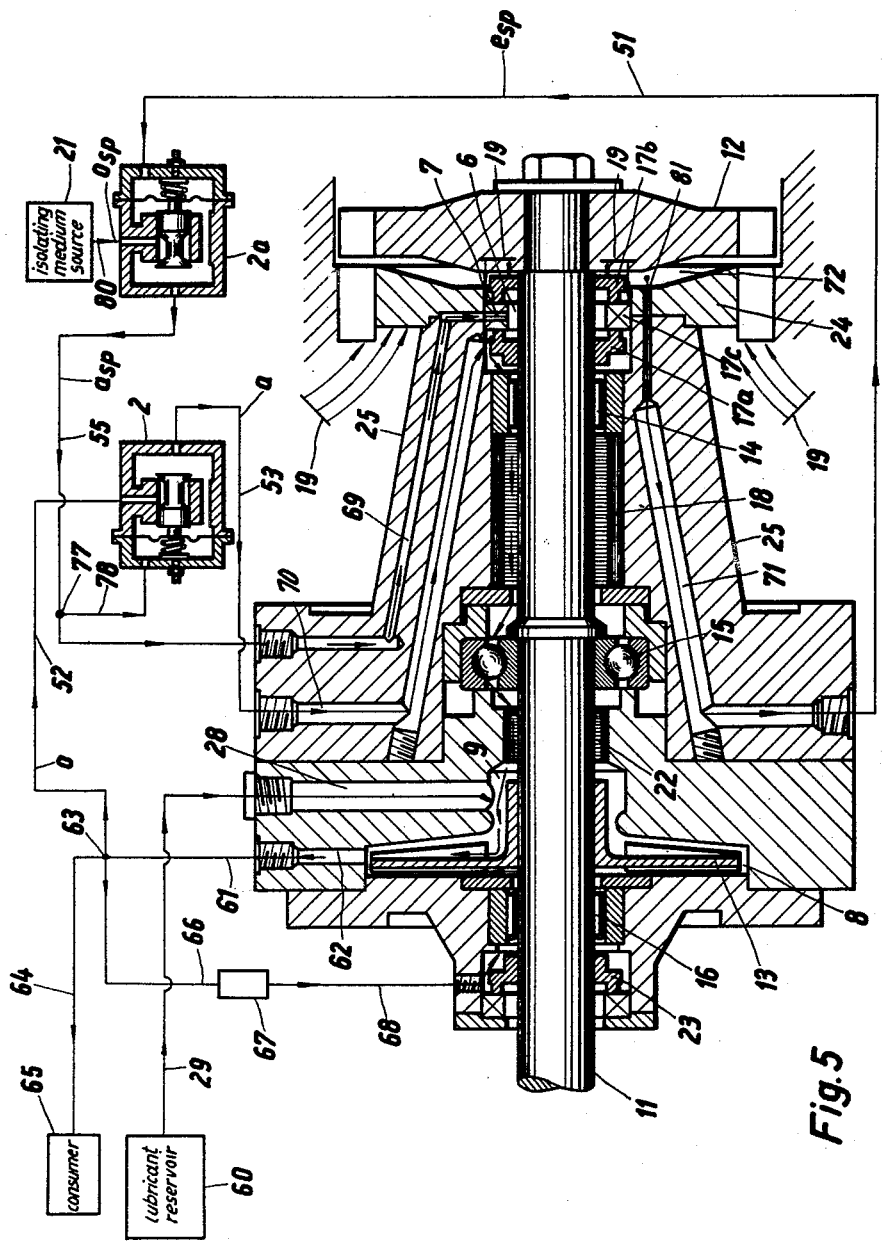

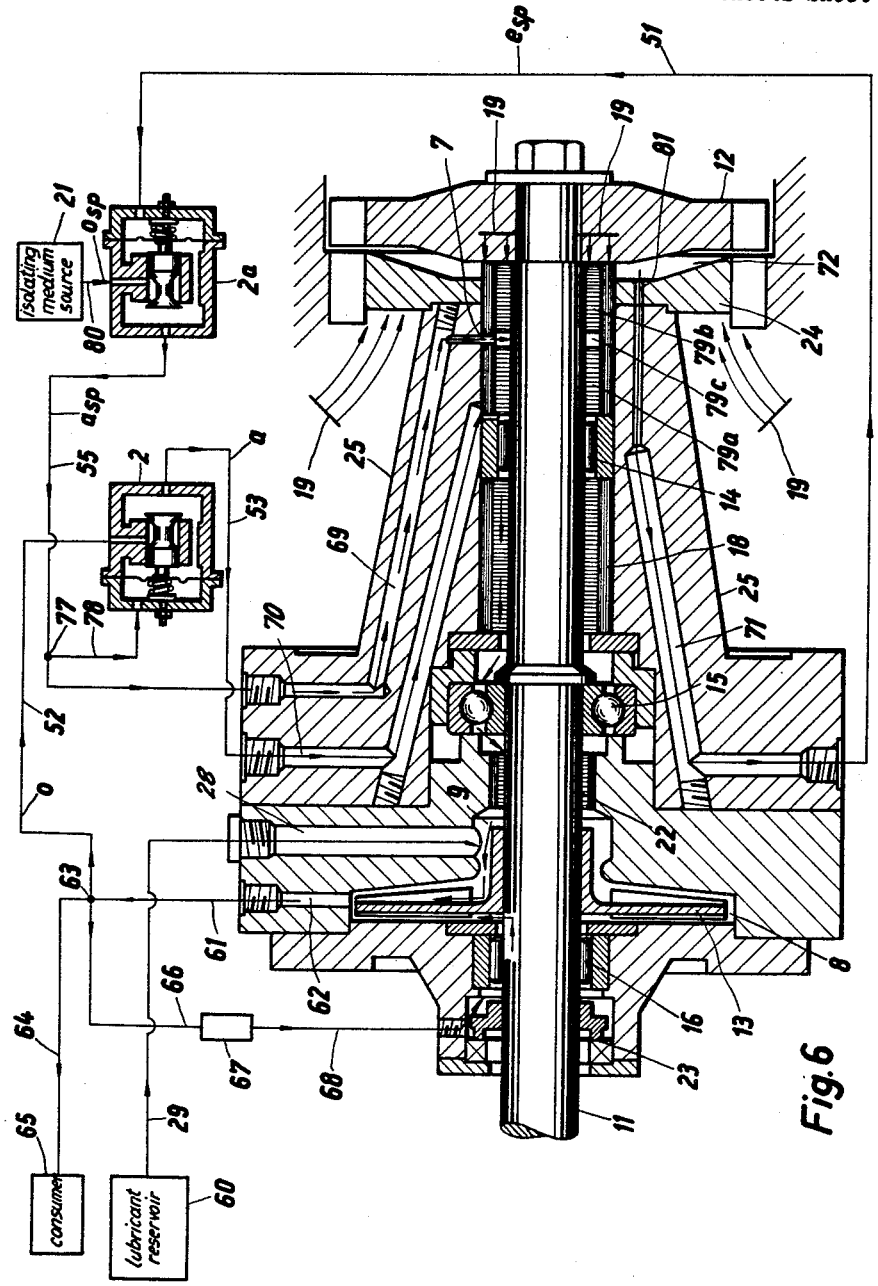

United States Patent Office 3,171,354
Patented Mar. 2, 1965

3,171,354
SHAFT BEARINGS SEALING AND LUBRICATING DEVICE AND METHOD
Just Söhlemann, Munich-Riemerling, Germany, assignor to Bolkow-Entwicklungen KG, Ottobrunn, near Munich, Germany
Filed Feb. 6, 1963, Ser. No. 256,610
Claims priority, application Germany, Feb. 13, 1962, B 65,914
7 Claims. (Cl. 103—87)

This invention relates to the sealing and lubrication of shaft bearings subjected to very high loads and stresses such as those associated with, for example, gas turbine engines, particularly rocket engines. More particularly, the invention is directed to the sealing and lubricating of such shaft bearings which are further subjected to attack by an active working medium at variable relatively high pressures.

As is known to those skilled in the art, the life of a shaft bearing is dependent not only on the static and dynamic stresses and loads to which it is subjected, but also, and to a very large extent, on the pressure, temperature and the nature of the medium surrounding the bearing. This is particularly true of bearings which must be sealed with respect to an ambient or surrounding medium. In such cases, the sealing or packing not only is subjected to attack by the active medium surrounding the bearing, but also must be able to withstand the pressure of fluids applied to the interior of the bearing. Assuming that bearing has been properly designed dimensionally, its life is thus dependent upon the life of the seal, and the latter is subjected to the pressure differential between the interior pressure of the bearing and the pressure of the medium surrounding the bearing.

In modern engines with extremely low specific weights, or low weights per horsepower, and of compact construction, the pressure on the turbine or rotor side of the bearing seal is at such a high value that the usual methods for sealing the shaft bearing are no longer sufficient. The pressure differential can, of course, be decreased by arranging a plurality of the normally used seals in series. However, this expedient results in increasing the axial length of the engine as well as an increase in its weight, and this is not permissible in high output engines, particularly those designed for use in flight vehicles.

Another problem resides in the fact that the lubricant supplied to the shaft bearing has to be adapted to the varying operating conditions since, due to the very high and variable speeds, the usual lubricating arrangements are not sufficient unless additional cooling measures are resorted to in order to dissipate the heat developed in the bearing. Particular precautions have to be taken if the operating or working medium is such that, upon contact with a lubricant, it reacts vigorously therewith, or where the ambient atmosphere surrounding the bearing will react with the lubricant.

The object of the present invention is to provide a novel means for sealing and lubricating shaft bearings subjected to high loads and stresses and by means of which the above mentioned difficulties can be overcome.

A further object of the invention is to shield the shaft bearings with respect to variations in the pressure of the surrounding medium while, at the same time, supplying the shaft bearing with lubricant, without losses, over the entire range of operating speeds, loads and stresses, including the starting phase of the operation, while insuring that the working medium of the ambient medium cannot enter or penetrate the bearing.

As a solution for the problems presented, in accordance with the invention, a pressurized medium such as a lubricant is directed to flow through at least one control valve which is under the control of a pilot pressure dependent upon the operating conditions of the rotary engine. The pressurized medium not only passes through this control valve but also applies pressure to a seal on the turbine side of the bearing in such a manner that the respective differential pressure effective upon the turbine side seal of the bearing is maintained, under all operating conditions, within a narrow predetermined range of values and that the pressurized lubricant, at the same time, flows through a sequence of bearings and seals in a predetermined direction. The sequence of bearings and seals is preferably arranged on a common shaft and is adjusted or regulated with respect to an over-all throttling action.

By the invention arrangement, a seal which, on the turbine side, is subjected to a high and variable pressure is relieved on the bearing side by the counterpressure of the pressurized lubricant, which counterpressure is varied in accordance with the gap pressure of the turbine. The differential pressure, which is determinative of the life of the seal, is thus made so small that even with the maximum pressures occurring on the turbine side, the usual, common, or customary seals may be used. Thus, the hitherto required sequence of seals necessary to take care of a large pressure differential is no longer necessary. In addition to reducing the weight of the rotary engine, due to a reduction in the over-all axial length required, the invention provides the additional advantage that the turbine shaft has a short length and thus a low reverse bending load. This is particularly advantageous with respect to the operation of the shaft at different speeds.

According to a further modification of the invention, the pressurized medium introduced into the bearing advantageously is an ordinary lubricant. However, it may also be a turbine or rocket fuel. The lubricant, during its flow through the sequence of bearing seals, is subjected to a certain decrease in pressure. For this purpose, the bearings and seals which are advantageously arranged on the common shaft, are so adjusted with respect to the operating pressures along the shaft or in an adjusting circuit, that they act sequentially as a throttle.

In accordance with the operation of the bearings during varying speeds, the throttle action of the bearing sequence changes. Thus, when the speed of the turbine increases, with increasing load, the throttle action increases in the same sense and prevents a premature decrease in the counter pressure required at the seal on the turbine side of the bearing.

With respect to the lubricant circulating circuit, a further advantage is obtained in that the lubrication of the bearing is made to correspond to the control characteristic of the engine in such a manner that, in accordance with the lubricant pressure which is adjusted in accordance with the operating conditions of the rotary engine, the lubricating fluid throughput through the bearing and thus, at the same time, the heat dissipation, increases with increasing engine load.

More specifically, the lubricant, on the high pressure side flows from a pump to a starting auxiliary control valve. The pilot pressure of this valve is the pump inlet or pre-pressure of the lubricant which flows to the pump, wherein the lubricant, after flowing through the sequence of bearings and seals, is directed to the pump input thus to complete the control circuit.

In order to cover all the different operating conditions, the invention arrangement thus utilizes, in the operating speed range, the gap pressure of the turbine as a control factor and, in the starting and stopping stages when the gap pressure tends to be substantially zero, the invention arrangement utilizes the inlet pressure of the pump as a control valve for the control circuit. Both control valves are so arranged in the control circuit or lubricating circuit that the lubricant can flow through them either jointly or individually, and they are so adjusted relative to each other that, within predetermined pressure limits, the two control pressures control, jointly or individually, the control circuit.

As a further feature, the pressure differential between the lubricant and the working medium on the turbine side provides the necessary safety such that the working or operating medium cannot penetrate through the seal into the bearing or into the lubricant circulating circuit. Furthermore, since the pressure differential at the seal, with the invention control arrangement, is maintained within predetermined limits, losses of lubricant by leakage through the seal into the operating space of the turbine are insignificant.

In accordance with a modification of the invention, in the event that the media used are such that do not have characteristics which can be produced with sufficient exactness, a blocking or isolating medium is provided as an additional safety measure. This blocking or isolating medium flows through a blocking medium control valve which has its operating position controlled by the operating conditions of the rotary engine or turbine. The blocking medium is delivered to the center of a seal on the turbine side and serves, at the same time, to provide the pilot pressure for the control valve in such a manner that the pressure differentials present between the lubricant and the blocking medium on the bearing side, and between the blocking medium and the working medium of the turbine, and which is normally operative on the seal, are maintained within the narrow predetermined limits under all operating conditions.

Preferably, the isolating medium control valve and the main control valve are arranged in tandem and are adjusted, relatively to each other, in such a manner that there is provided, at the half seal on the bearing side, an equilibrium pressure between the lubricant and the isolating medium. At the sealing portion on the turbine side, there is provided a pressure excess of the isolating medium relative to the working medium of the turbine, and this excess pressure is also maintained within narrow predetermined limits.

More specifically, the control circuit of the invention includes at least one control valve, a pump, a sequence of seals and bearings arranged on the shaft of the turbine and surrounded by a casing, and a connection for receiving the gap pressure of the turbine. All of these components are provided in such an arrangement that the pressure of the lubricant due to the pump, and operative at the bearing side of the seal in correspondence with the respective gap pressure of the turbine, is always greater than the pressure of the working medium, and the throttle action of the sequence of bearings and seals, in correspondence with the respective operating pressures, is adjusted relative to the control valve and the seal on the turbine side in such manner that, under all operating conditions including the lowest pressure, the direction of the flow of the lubricant is always assured to be toward the inlet of the pump.

In accordance with the invention, the seal adjacent the turbine may be either a labyrinth seal or a gliding or sliding ring seal. In the event that a blocking or isolating medium is used, the mentioned seals are arranged in pairs and form a preferably annular hollow space around the shaft to receive the blocking or isolating medium.

For an understanding of the principles of the invention, reference is made to the following description of typical embodiments thereof as shown in the accompanying drawings.

In the drawings:

FIG. 5 is a view, similar to FIG. 4, showing the use of the control circuit of the embodiment as shown in FIG. 2; and FIG. 6 is a partial axial sectional view, similar to FIG. 5, but showing a labyrinth seal used on the turbine side rather than the gliding ring seal of FIG. 5.

Figure 1:
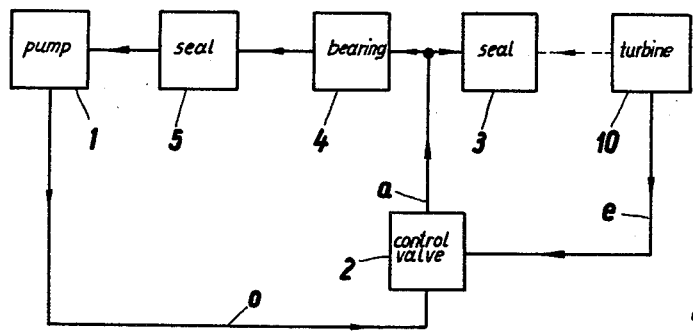
FIG. 1 is a block diagram illustrating one embodiment of lubricant flow control circuit in accordance with the invention.
Figure 2:
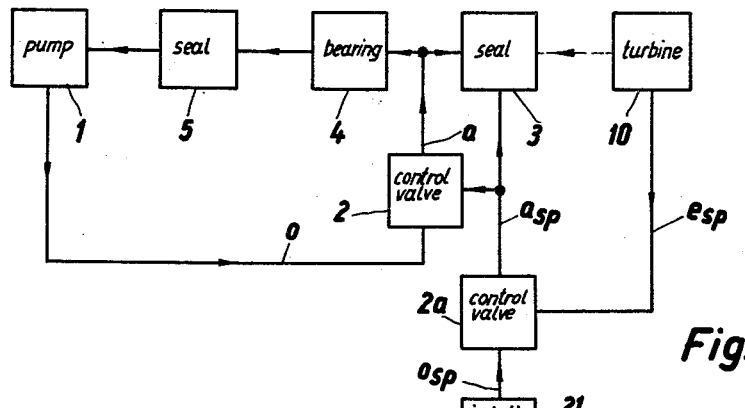
FIG. 2 is a view similar to FIG. 1, illustrating a second embodiment of the control circuit utilizing a blocking or isolating medium.

The operation of the invention will be understood best by reference, first, to the block diagrams of FIGS. 1 and 2. Referring to FIG. 1, the lubricant control circuit includes a pump 1, a control valve 2, a packing or seal 3 on the turbine side of a shaft bearing 4, and a further seal 5. The gap pressure of a turbine 10, whose working medium is the active medium previously mentioned, is applied to the control valve 2 as a pilot pressure $e$. The lubricant delivered from the pump 1 has a pressure $o$ which is reduced by the control valve 2 in accordance with the pilot pressure $e$, and the lubricant or medium at a reduced pressure $a$ is provided at the output of the control valve 2. The discharge pressure $a$ is so selected that both the seal 3, which is subjected to the gap pressure of the turbine, is relieved of the full gap pressure and the lubricant is further forced toward the pump through the shaft bearing 4 and the seal 5. By means of the control valve, the discharge pressure $a$ is made to correspond at all times to the gap pressure of the turbine.

The arrangement shown in block diagram form in FIG. 2 has an additional safety feature in that it utilizes a blocking medium for the seal 3. In addition to pump 1, control valve 2, seal 3, shaft bearing 4 and seal 5, the circuit of FIG. 2 includes an isolating medium control valve $2a$ to which the isolating medium is delivered from a source or reservoir 21. The isolating medium may be, for example, an inert gas having a pressure of $o_{sp}$. The gap pressure of turbine 10 is applied to blocking medium control valve $2a$ as a pilot pressure $e_{sp}$. The isolating medium, whose pressure at the discharge of control valve $2a$ has been reduced to the value $a_{sp}$ by valve $2a$ and in accordance with the pilot pressure $e_{sp}$, is directed, on the one hand, to the center of seal 3 which is on the turbine side of the bearing, as described hereinafter. At the same time, the isolating medium pressure serves as a pilot pressure for control valve 2 which reduces the input pressure $o$ of the lubricant to the output or discharge pressure $a$.

By means of control valves $2a$ and 2, the respective pressures $a_{sp}$ and $a$ are varied in accordance with variations in the gap pressure of the turbine. This is effected in such manner that the pressure acting against seal 3 is relieved by the pressure of the isolating medium which is higher than the pressure of the gap, and in such a manner that the lubricant is forced toward the pump through shaft bearing 4 and seal 5. In order that the lubricant and the isolating medium do not intermix with each other, or in order that such intermixture should be kept to a minimum, the control circuit is so constructed that, at the bearing side of seal 3, there exists an equilibrium between the lubricant pressure and the pressure of the isolating medium passing through the seal 3.

Figure 3:
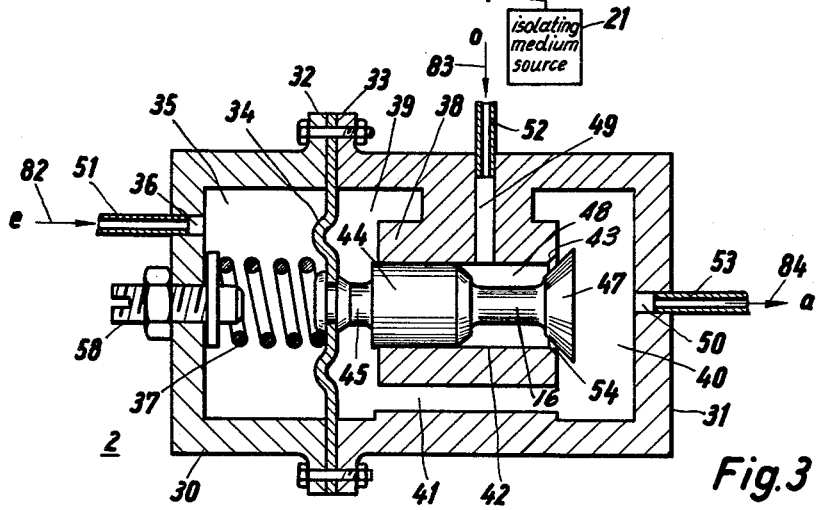
FIG. 3 is an axial sectional view of a control valve used in the control circuit.

In both embodiments of the invention, control valves such as illustrated in FIG. 3 are used. The control valve 2 of FIG. 3 comprises two casing sections 30 and 31 clamping between them a membrane 34, the membrane 34 being clamped between reinforcing flanges 32 and 33. Membrane 34, acting conjointly with casing section 30, forms a membrane chamber 35 on the pilot side of the valve. Through bore 36, this chamber 35 has applied thereto the pilot pressure $e$ which is applied to bore 36 through a line 51, the pilot or gap pressure acting in the direction of the arrow 82. A spring 37 adjustable by means of a bolt 58 is used to preset the desired pressure on the membrane 34.

On the control side of the valve 2, a central body portion 38 divides the space defined by the casing section 31 into a membrane chamber 39 on the control side and a chamber 40 on the discharge side. These two chambers are in communication with each other through an equalization passage or aperture 41. The body portion 38 is formed with a guiding bore 42 whose end toward the control side is formed as a valve seat 43. A piston 44 is slidable in bore 42 and is connected by a push rod 45 with membrane 34. On the control side, a stem 46 connects piston 44 with a valve head 47, the valve head 47 thus being rigidly connected to the piston 44.

A chamber 48, which is a portion of the bore 42 and annularly surrounds the stem 46, communicates on the charging side with a bore or passage 49 which is in communication with a tube or line 52 supplying the lubricant under the charging pressure $o$ and in the direction of the arrow 83. The transition sections joining rod 46 to piston 44 and valve 47 are so formed as to provide for thrust equalization. A bore 50 communicating with the chamber 40 on the discharge side has communicating therewith a line 53 which, as indicated by the arrow 84, supplies lubricant at the discharge pressure $a$ to the bearings. In FIG. 3, the valve head 47 is shown in the rest state.

Figure 4:
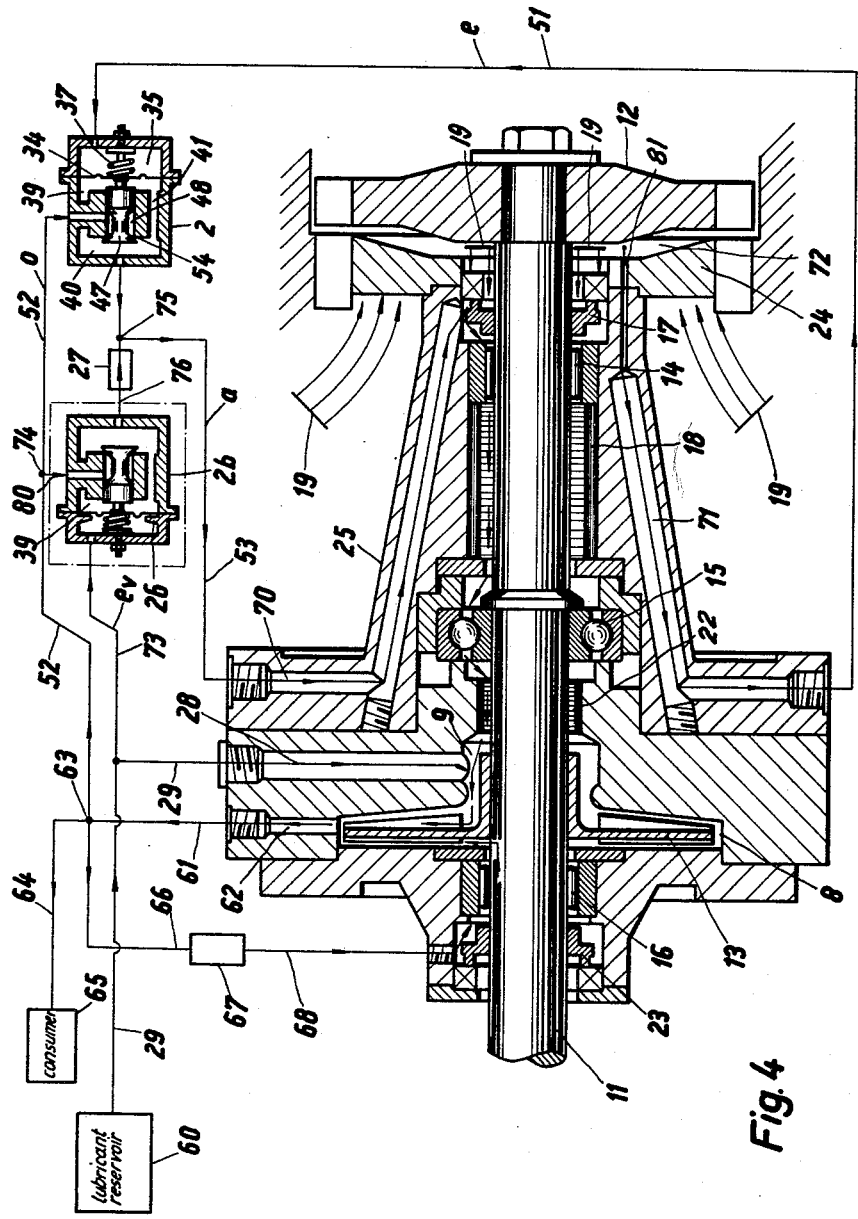
FIG. 4 is a partial axial sectional view of a rotary engine illustrating, associated therewith, the control circuit of FIG. 1 as further provided with a starting auxiliary control valve.

Referring to FIG. 4, the rotary engine therein partially illustrated includes a common shaft 11 on which is secured a turbine rotor 12 and the rotor 13 of the pump, this rotor 13 rotating in a pump casing 8. This corresponds to the pump indicated by reference numeral 1 in FIGS. 1 and 2. The shaft bearing 4, which has been indicated only diagrammatically in FIG. 1, is illustrated as comprising a roller bearing assembly 14 and a ball bearing assembly 15.

The seal 3 on the turbine side of the bearing is illustrated, in FIG. 4, as a slip ring seal or gliding ring seal 17. Between roller bearing 14 and ball bearing 15 there is arranged a labyrinth seal or packing 18, and between ball bearing 15 and pump rotor 13, there is arranged a further labyrinth seal 22.

The casing of pump rotor 13 is formed with a bore 28 which is connected by a line 29 to a lubricant reservoir 60. On the high pressure side of the pump, there is a distributing or output line 61 which is schematically illustrated as extending from a bore 62 in casing 8 to a distributing point 63, and from there through a consumer line 64 to a consumer or pressure maintaining means 65.

A lubricant line 52 extends from distributing point 63 to control valve 2, and a lubricating line 53 connects control valve 2, through a bore 70 in the casing portion 25, with the gliding ring seal 17 on the turbine side of the bearing. The pilot side of control valve 2 is connected to the gap space 72 of the turbine by a line 51 so that this pilot side is provided with the gap pressure. The gap pressure of the turbine, from the space 72, is directed through a bore 71 in casing portion 25, which is connected to the gap 72, by a bore 81 arranged as a pressure discharge area in the vane guide ring 24.

A control valve $2b$ is illustrated in a broken line frame in FIG. 4, and this latter control valve, which is controlled by low pressure, corresponds in construction to the control valve 2 and functions as a starting auxiliary control valve. For this purpose, a branch line 73 extends from the line 29 to the pilot side of valve $2b$, and valve $2b$ is connected in the control circuit in parallel with the control valve 2 on both the inlet and outlet sides and by means of the fork areas 74 and 75 and the branch lines 76 and 80.

Disregarding the starting auxiliary control valve $2b$, the control circuit of FIG. 4 operates in the following manner. It will be assumed that shaft 11 is driven, in a known manner, by means of the turbine rotor 12. Lubricant flows from reservoir 60 to the pump through line 29 and bore or passage 28, this flow taking place under a certain inlet pressure. In order to prevent any reverse flow of lubricant in the control circuit, rotor bearing 15 is sealed against the pump space 9 by means of the labyrinth seal 22 whose throttle action, in the flow direction indicated by the arrows, is adjusted to correspond to that desired in the control circuit. Pump rotor 13 compresses the lubricating medium so that the lubricant leaves the pump, on the high pressure side, through bore 62 and, through distributing line 61, is supplied, under pressure, to distributing point 63. From point 63, the line 64 directs fluid to the consumer 65 which has been illustrated only diagrammatically since it is not concerned with the invention.

The lubricant discharged from the pump, through line 52, applies the input or charging pressure $o$ to the chamber 48 of control valve 2. From there, the lubricant flows through annular gap 54 into chamber 40 on the discharge side. In this flow, the pressure of the lubricant is reduced to the discharge pressure $a$ as previously mentioned. The annular gap 54 has been adjusted by the pilot pressure $e$ as well as by the adjusting force of membrane 34, this all being exerted on the valve head 47.

The discharge pressure $a$ is exerted, through the equalizing opening 41, on membrane 34 and causes a change in the position of the valve head and thus of the magnitude of the annular gap 54 for a sufficient time until there has been established a pressure equilibrium, at membrane 34, between the pilot pressure $e$, reinforced by spring 37, and the discharge pressure $a$, which corresponds to the respective throttle position.

The pilot pressure $e$ is derived from the operating space of the turbine, between turbine rotor 12 and guide ring 24, through bores 71 and 81 and line 51, and thus corresponds to the gap pressure of the turbine. The active working medium of the turbine is indicated, in FIG. 4, by the arrows 19.

From control valve 2, the lubricant, at the discharge pressure $a$, is directed through lubricating line 53 and bore 70 in casing 25, to the sealing means 17. This seal is subjected, on the turbine side, to the pressure of the working medium of the turbine. By application of a lubricant to its other side, its bearing side is charged to the pressure of the lubricant. Due to the excess pressure of the lubricant, as adjusted at control valve 2, relative to the pressure of the working medium, an effective seal against penetration of the working medium into the bearing is provided.

From seal 17, lubricant flows through roller bearing 14 and labyrinth seal 18 to roller bearing 15, and through labyrinth seal 22 to the pump rotor 13. At this point, the lubricant is combined with the flow of lubricant to the pump, out of the pump inlet pressure, from the reservoir 60. The bearings and seals are so adjusted, with respect to their throttling action, that flow of the lubricant in the direction indicated by the arrows is assured. This adjustment further provides that, during a rest position of turbine rotor 12, the inlet pressure of the pump cannot effect any reverse flow of lubricant in the control circuit.

The starting auxiliary valve $2b$ has the primary task of supplying the bearings with lubricant during starting and coming up to speed of the turbine, as for example, when there is no pilot pressure $e$ to operate on the control valve 2.

If the pilot pressure $e$ during operation drops the membrane 34 of valve 2 follows this pressure decrease, a valve movement occurs in a direction to decrease the annular gap 54. At the same time, the pressure in lubricating line 53 drops to the same extent as corresponds to the closing of the annular gap 54 of control valve 2. Through T connection 75 and branch line 76, this pressure decrease is exerted on the chamber 40 on the discharge side of the valve 2b, and thus exerts an influence on the membrane chamber 39 of this valve. If the pilot pressure $e$ drops to a greater extent, the condition will occur wherein the pilot pressure $e$ and $e_v$ will operate on the membrane with equal forces and thus both control valves will convey lubricant jointly from line 52 into line 53. When pilot pressure $e$ decreases still further, then, due to the pressure excess at the membrane 34, control valve 2 will be closed. At this time, the starting auxiliary valve 2b takes over to control supply of lubricant to the line 53. In this manner, and by respective adjustment of the forces acting on the membranes of the control valves 2 and 2b, the shaft bearings are supplied with lubricant during starting and coming up to speed of the turbine, during which time there is substantially no gap pressure in the turbine.

It is also possible that starting auixiliary valve 2b may have its operating point changed by changing the tension of spring 37 by adjusting bolt 58, or by changing the area of the membrane surface which is effected by the inlet pressure of the pump so that the valve 2b can be adjusted, relative to control valve 2, in such a manner that these two valves will act alternately with respect to supplying pressure fluid to the seal on the turbine side of the bearing, and also supplying lubricant under pressure to the bearing. In effecting this operating, and for safety reasons, the adjustment will be so selected that the pressure ranges overlap so that, in the overlapping range, both control valves will operate conjointly. The control valves 2 and 2b are thus made operative sequentially.

As mentioned, control valves 2 and 2b are connected with each other on the discharge line via line 53 and branch line 76. Thus, there will always be exerted on the membrane chamber 39 of both valves the same lubricant pressure. The pilot pressure $e$ and $e_v$ will vary, however, in correspondence with the operating conditions of the engine. If the pressure differential at the membrane 35 in starting auxiliary valve 2b is too large a value, then pressure compensation has to be provided. For this purpose, a stroke limiting means 26, as shown in FIG. 4, will exert a pressure on the pilot side of the starting auxiliary control valve 2b. However, a back pressure valve 27 of known construction may be provided in branch line 76, or both of these expedients may be used conjointly. Back pressure valve 27 may be eliminated when the previously mentioned starting and coming up to speed difficulties are not present. This occurs when, for dimensional reasons, a distribution of the adjustment into several pressure ranges is not necessary. It should be noted that the constructional embodiment of FIG. 4 corresponds essentially to the block diagram of FIG. 1.

From the foregoing, it is believed that it will be clear that, in accordance with the pump dimensions and the control characteristics of the control valve or valves, each pilot pressure $e$ or $e_v$ corresponds to a predetermined valve position and thus to a predetermined magnitude of the pressure in the annular gap 54. Thus, the pressure in this gap controls, in accordance with the speed of the rotary engine, the lubricating flow discharged from the pump so that, corresponding to a change of the pilot pressure $e$, a corresponding change is effected in the discharge pressure $a$. The bearings and seals thus are operative, during all operating conditions of the engine, to maintain predetermined pressure conditions within narrow limits.

That embodiment of the invention in which an isolating medium is used will now be explained with particular reference to FIGS. 5 and 6. In these figures, all of the illustrated parts of the engine correspond to those shown in the sectional view of FIG. 4, and those parts which correspond with corresponding parts of FIG. 4 have been indicated with the same reference numerals. Shaft 11 again carries the turbine rotor 12 and the pump rotor 13, and the shaft bearing similarly comprises a roller bearing 14 and a ball bearing 15.

In FIG. 5, the seal 17 on the turbine side of the bearing comprises, in contradistinction to the embodiment of FIG. 4, two glide rings 17a and 17b which are spaced by a common center piece 17c. In the hollow annular space 6 defined by the glide rings 17a and 17b, an isolating medium, preferably in the form of an inert gas, is applied through a bore 7. The isolating medium is obtained from a container or reservoir 21 and is supplied to space 6 through a line 80 and an isolating medium control valve 2a whose construction and function is the same as that of the control valve shown in FIG. 3. The isolating medium with a pressure $a_{sp}$ is supplied through an isolating medium line 55 and a bore 69 in casing 25, bore 69 extending parallel to the lubricating passage 70.

As described in connection with FIG. 4, the gap pressure of the turbine is applied, through a bore 81, to isolating medium control valve 2a through line 51 and at a pilot pressure $e_{sp}$. The lubricant from reservoir 60 is directed through pump line 29 and bore 28 into the pump space 9, and from there through bore 62 to the distributor line 61, distribution point 63, consumer line 64 and the main pressure consumer 65. At point 63, the lubricant flow is branched and is supplied, through line 52 and at the pump outlet pressure $o$, to control valve 2. Control valve 2 at the pilot side is supplied with the isolating medium, under pressure to line 55, branch area 77 and branch line 78. The blocking medium has, as its pilot magnitude, the discharge pressure $a_{sp}$.

The lubricant which is delivered through line 52, and whose pressure is proportional to pressure $a_{sp}$ of the isolating medium, is delivered by control valve 2, through line 53 and bore 70, to the gliding or sliding ring seal 17a, 17b and 17c on the turbine side, and at the pressure $a$.

In the arrangement of FIG. 6, the seal on the turbine side of the bearing is a double acting labyrinth seal 79a and 79b which, with the center piece or spacer 79c, form an annular space 6 about shaft 11. The operation of the control circuit of FIG. 6 is analogous to that of FIG. 5.

In the arrangement of FIGS. 5 and 6, it should be understood that both control circuits can be connected to an auxiliary starting valve 2b in the same manner as described in connection with FIG. 4. For the sake of completeness, it should be mentioned that, in FIGS. 4, 5 and 6, there is shown a low pressure control circuit which is parallel to the main control circuit. From the point 63, the lubricant medium flows through a branch line 66 to a throttle valve 67 and charges, through a low pressure line 68, a sliding ring seal 23 and then flows through roller bearing 16 to the pump inlet space 9. With the arrangement described, or by analogous parallel or successive cutting in of branch circuits which are correlated or adjusted with respect to each other, a supply of lubricant to additional positions is possible.

While specific embodiments of the invention have been shown and described in detail to illustrate the application of the principles of the invention, it will be understood that this invention may be embodied otherwise without departing from such principles.

What is claimed is:

1. In a heavy duty rotary engine, such as a liquid fueled rocket engine, a casing portion; a shaft extending through said casing portion; first and second axially spaced bearings rotatably mounting said shaft in said casing portion; means for supplying a reactive working medium to said engine at a first end of said casing portion, said medium being under relatively high and variable pressure; first sealing means between said shaft and said casing at said one end of said casing portion, said first sealing means being disposed between one of said bearings and the portion of said engine subjected to said reactive working medium; means for applying a second medium, under relatively low pressure, to said engine at the opposite end of said casing portion; second sealing means between said shaft and said casing portion sealing said casing portion and said shaft from said relatively low pressure medium; a high pressure source of said second medium; a conduit connected to the space between said first bearing and said first seal; a control valve between, and communicating with, said high pressure source and said conduit; means connecting said control valve to the portion of said engine containing said reactive medium to apply a pilot pressure to said control valve; third sealing means between said shaft and said casing portion disposed between said first and second bearings; said first and second bearings and said second and third sealing means forming a sequence of throttling means through which said second medium flows in a direction from said first bearing to said second bearing; said control means, responsive to the pilot pressure of said reactive medium, maintaining a pressure differential at said first sealing means between said reactive medium and said second medium, which pressure corresponds to the pressure value of said reactive medium under all operating conditions of said engine; said pressure differential having a value such that flow of fluid through said first sealing means is inhibited.

2. In a heavy duty rotary engine, such as a liquid fueled rocket engine, a casing portion; a shaft extending through said casing portion; first and second bearings in axially spaced relation rotatably supporting said shaft in said casing portion; means for supplying a reactive working medium to said engine adjacent a first end of said casing portion, said working medium being supplied under a high and variable pressure; a turbine rotor rigidly secured to said shaft and operated on by said reactive medium; first sealing means between said shaft and said casing portion adjacent said one end of said casing portion; means for supplying a second pressure medium under a relatively low pressure to the opposite end of said casing portion; second sealing means between said shaft and said casing portion at said other end of said casing portion, said second sealing means being disposed between said second bearing and said second end of said casing portion; a reservoir containing a supply of said second pressure medium; a pump housing connected with said casing portion; a low pressure conduit connecting said reservoir and said pump casing; a pump rotor rigidly secured to said shaft within said pump casing; a supply conduit connected to the space between said first bearing and said first sealing means; a control valve disposed between the discharge of said pump and said supply conduit; means for applying the pressure of said reactive medium as a pilot pressure to said control valve; third sealing means between said casing portion and said shaft and between said first and second bearings; said bearings and said seals forming a throttling sequence in advance of the inlet of said pump casing; and which throttling sequence has said second pressure medium flowing therethrough in a direction from said first bearing to said second bearing; said control valve maintaining the pressure differential between said reactive medium and said second medium, at said first sealing means, at a value sufficiently small as to inhibit flow of fluid through said first sealing means.

3. In a heavy duty rotary engine, such a liquid fueled rocket engine, a casing portion; a shaft extending through said casing portion; first and second bearing means rotatably supporting said shaft in said casing portion and spaced axially from each other; means for supplying a reactive working medium to said engine adjacent a first end of said casing portion; a turbine rotor rigidly mounted on said shaft and subjected to said reactive working medium; a first sealing means disposed between said first bearing and said first end of said casing portion; means for supplying, a low pressure second medium to the opposite end of said casing portion; second sealing means disposed between said second bearing means and said opposite end of said casing portion; a reservoir containing said second medium; a pump casing connected with said casing portion; a low pressure conduit connecting said reservoir to said pump casing; a pump rotor rigidly secured to said shaft within said pump casing; a supply line connected to the space between said first bearing means and said first sealing means; a first control valve connected between the outlet of said pump and said supply conduit; means for applying the pressure of said reactive medium to said first control valve as a pilot pressure; a second control valve arranged between the outlet of said pump and said supply means; means connecting said reservoir to said second control valve; the pressure within said reservoir serving as a pilot pressure for said second control valve; a third sealing means disposed between said first and second bearings; said bearings and seals forming a sequence of throttling means in advance of the inlet of said pump, and which throttling means has said second medium flow therethrough in a direction from said first bearing to said second bearing; said first control valve maintaining the pressure differential between said reactive medium and said second medium, on opposite sides of said first sealing means, at a value so small, during all operating conditions of said engine, as to inhibit fluid flow through said first sealing means; said first and second control valves being so correlated that, when there is no pilot pressure available at said first control valve, said second control valve will maintain such differential pressure at a value such that there will be no fluid flow through said first sealing means, but sufficient lubricant fluid flow through the sequence of bearings and seals.

4. In a heavy duty rotary engine, such as a liquid fueled rocket engine, a casing portion, a shaft extending through said casing portion; first and second bearings rotatably mounting said shaft in said casing portion and arranged in axially spaced relation; means for supplying a reactive working medium to said engine adjacent one end of said casing portion at a relatively high and variable pressure; a rotor rigidly secured to said shaft and subjected to said reactive medium; first sealing means between said shaft and said casing portion, and disposed between said first bearing and said one end of said casing portion, said first sealing means comprising two sealing elements and a separating element conjointly defining an annular space surrounding said shaft; a reservoir containing an isolating medium; an isolating medium control valve connected to said reservoir; means for applying the pressure of said reactive medium to said isolating medium pressure control valve, as a pilot pressure; flow means connecting the outlet of said isolating medium pressure control valve to said annular space; means for applying a third medium at a low pressure to the opposite end of said casing portion; second sealing means disposed between said second bearing and said opposite end of said casing portion; a reservoir containing said third medium; a pump casing connected with said casing portion; means connecting said pump casing to said container of said third medium; a pump rotor fixedly secured on said shaft within said pump casing; a supply line connected to the space between said first bearing and said first sealing means; a second control valve interposed between the outlet of said pump casing and said supply line; means connecting said second control valve to the outlet of said first control valve to apply the pressure of said isolating medium as a pilot pressure for said second control valve; a third sealing means between said first and second bearings; said bearings and said sealing means forming a sequence of throttling means in advance of the inlet of the pump casing, and through which said third medium flows in a direction from said first bearing to said second bearing; said control valves conjointly maintaining the pressure differential between opposite sides of said first sealing means at a value so small that, under all operating conditions of said engine, fluid flow through said first sealing means is effectively inhibited.

5. In a rotary engine, as claimed in claim 1, said first sealing means comprising a sliding ring seal.

6. In a rotary engine, as claimed in claim 4, said first sealing means comprising a sliding ring seal.

7. In a rotary engine, as claimed in claim 4, said first sealing means comprising labyrinth seals.

References Cited by the Examiner

UNITED STATES PATENTS

| 2,608,380 | 8/52 | Rice | 253—39 |
| 2,730,954 | 1/56 | Hornschuch | 103—111 |

FOREIGN PATENTS

| 1,048,932 | 1/59 | Germany. |

LAURENCE V. EFNER, *Primary Examiner.*

ROBERT M. WALKER, *Examiner.*